United States Patent
Ogino et al.

[11] Patent Number: 6,051,902
[45] Date of Patent: *Apr. 18, 2000

[54] MAGNETIC ATTRACTION DRIVING ENGINE USING PERMANENT MAGNET

[76] Inventors: Sanshiro Ogino, 2-20-1, Futaba, Shinagawa-Ku, Tokyo; Keiichiro Asaoka, 8-8, Izumi-cho, Atsgi-shi, Kanagawa, both of Japan

[*] Notice: This patent is subject to a terminal disclaimer.

[21] Appl. No.: 09/195,036

[22] Filed: Nov. 19, 1998

Related U.S. Application Data

[63] Continuation of application No. 08/534,115, Sep. 26, 1995, Pat. No. 5,886,442.

[51] Int. Cl.[7] ................ H02K 1/17; H02K 3/46
[52] U.S. Cl. ........................... 310/154; 310/181
[58] Field of Search ................ 310/12, 181, 152, 310/154

[56] References Cited

U.S. PATENT DOCUMENTS

3,411,027  11/1968  Rosenberg ................ 310/181
3,604,959  9/1971  Sturman ................ 310/12

*Primary Examiner*—Nestor Ramirez
*Assistant Examiner*—K. Imayoshi E. Tamai
*Attorney, Agent, or Firm*—Oblon, Spivak, McClelland, Maier & Neustadt, P.C.

[57] ABSTRACT

A magnetic attraction driving engine utilizing a permanent magnet is provided with a permanent magnet, an electromagnet formed by winding a coil on a magnetic core with one end thereof stuck to one magnetic pole end of the permanent magnet, an excitation controller for exciting the electromagnet to change a state of magnetic fluxes in the vicinity of the magnetic pole end of the permanent magnet, a movable member having magnetic attractivity set in the vicinity of the magnetic pole end of the permanent magnet by being supported and guided so as to be capable of coming close to or separating away from the permanent magnet and a returning force applying member for causing by pressure the movable member to retreat against a magnetic attracting force and move back and forth by changing a magnetic attracting force of the permanent magnet.

1 Claim, 8 Drawing Sheets

MAGNETIC ATTRACTION DRIVING ENGINE USING PERMANENT MAGNET

CROSS REFERENCES TO RELATED APPLICATION

This application is a Continuation of application Ser. No. 08/534,115 filed Sep. 26, 1995, now U.S. Pat. No. 5,886,442.

A propulsion magnetic field generator utilizing a magnetic attraction driving engine and an energy converter.

BACKGROUND OF THE INVENTION

1. Field of the Invention

The present invention relates to a magnetic attraction driving engine for converting electrical energy into kinetic energy by utilizing a permanent magnet.

Also, the invention relates to a propulsion magnetic field generator for generating various propulsion magnetic fields by using a permanent magnet and an energy converter for converting magnetic field energy into kinetic energy by using this propulsion magnetic field generator, in particular to an energy converter useful when implemented as a rotary motor, a linear motor or the like.

2. Prior Art

Conventionally, various energy converters utilizing permanent magnets have been used. Typical of those which convert electrical energy into kinetic energy is a motor. In the case of a DC motor, a DC current is caused to flow to the coil of a rotor placed in a magnetic field generated by a permanent magnet and the rotor is rotary-driven by working with a magnetic field thus generated.

In an AC synchronizing motor or an AC inductive motor which has also been conventionally used, an exciting current is caused to flow by applying an AC voltage to an exciting coil provided in a magnetic pole of a stator with a required phase difference to generate a rotating magnetic field, and a rotor is rotated by being synchronized therewith. In the case of a linear motor, likewise, an exciting current is caused to flow by applying an AC voltage to a number of linearly arrayed exciting coils with a required phase difference, a straight advance magnetic field is generated and a propelling power is imparted to a magnetic movable body.

That is, a propulsion magnetic field generator used in a rotary motor, a linear motor and the like for generating a rotating magnetic field or a straight advance magnetic field has a structure designed to generate a propulsion magnetic field in a required direction by supplying an exciting current to a plurality of exciting coils with a phase difference.

However, the energy converters of these conventional types, represented by the above-described DC motor, are not structured to directly extract magnetic energy possessed by a permanent magnet to the outside and thus the energy converting efficiency thereof is relatively low.

Furthermore, in an energy converter such as a rotary motor, a linear motor and the like using a conventional propulsion magnetic field generator, since a rotational speed or a position moving speed is set with a phase difference of a propulsion magnetic field, this depends on the frequency of an AC power source, making it difficult to set a rotational speed at an optional value except for some motors such as a coil type inductive motor and the like, and thus generally the rotational speed is controlled by means of an inverter. However, this inverter generates high frequencies and consequently damages control equipment in the vicinity thereof. Moreover, in a conventional device, since a rotational force or a straight advancing force such as kinetic energy is in proportion to a current to be applied, it is necessary to provide power capacitance corresponding to the necessary torque, and for this reason it has been difficult to improve energy efficiency.

SUMMARY OF THE INVENTION

The present invention was made in view of the above-described problems, and it is an object of the invention to provide a new magnetic attraction driving engine directly utilizing the magnetic energy of a permanent magnet.

It is another object of the invention to provide a new propulsion magnetic field generator using a permanent magnet capable of improving energy efficiency by utilizing the magnetic attraction driving engine.

It is still another object of the invention to provide an energy converter for making a propulsion magnetic field such as a rotating magnetic field, a straight advance magnetic field or the like by indirectly extracting a magnetic flux of a permanent magnet and thereby actuating a magnetic body.

The invention is designed to intermittently or continuously extract the required mechanical energy from a permanent magnet by using an electromagnet as a means for switching magnetic fluxes from the permanent magnet when mechanical energy is to be made by utilizing the permanent magnet.

More specifically, a magnetic attraction driving engine using a permanent magnet provided by the invention is characterized in the following way:

A permanent magnet is provided with an electromagnet structured by providing a coil in a magnetic core, one end of which is closely adhered to one magnetic pole end thereof. An excitation controller for exciting the electromagnet is connected to the electromagnet so as to change the density of magnetic fluxes in the vicinity of the magnetic pole end of the permanent magnet. In the vicinity of the magnetic pole end of the permanent magnet, a movable member having magnetic attraction to be moved close to or away from the permanent magnet is pivotaly supported and a returning force applying member for giving a required returning force by pressure in a direction in which the movable member is moved away from the permanent magnet. In this way, the movable member can be moved back and forth.

A coil which is part of the electromagnet can be made of normal electrically conductive wire, using such generally known materials as copper, aluminum and others. However, a superconductive magnet made of a superconductive material may be adopted. Moreover, needless to say, a single coil can be used or two coils independent of each other can be provided in the magnetic core. In a case where the electromagnet is structured by using a single coil, switching of magnetic polarity in one end of the magnetic core can be performed by supplying, for instance, a rectangular wave signal from the excitation controller to the single coil. As a result, it is possible to change the condition of magnetic fluxes in the vicinity of one magnetic pole end of the permanent magnet.

On the other hand, in case where two coils independent of each other are wound on the magnetic core, the excitation controller can be structured so as to be capable of switching magnetic polarity in one end of the magnetic core by alternately switching supplying of a current between one coil and the other.

As a magnetic material of the movable body, such generally known ones as iron, nickel, ferrite and others can be used. However, it is possible to obtain required magnetic attractivity by integrating a magnetic member into a nonmegnetic member formed of aluminum, plastic or the like.

When the exciting condition of the electromagnet is controlled by the excitation controller, magnetic polarity in one end of the magnetic core closely adhered to one end of the permanent magnet changes and thus density of magnetic fluxes in the vicinity of one magnetic pole end thereof is caused to change. As a result, magnetic attraction between the movable member and the permanent magnet changes, making it possible to move the movable body back and forth by cooperatively working with the returning force applying member.

A propulsion magnetic field generator of the invention for generating a propulsion magnetic field in a specified working space is provided with a plurality of permanent magnet members set at proper spaces in accordance with a required pattern for generating a propulsion magnetic field and a plurality of magnetic flux control equipments made of electromagnets set corressponding to the permanent magnet members, and the number of magnetic fluxes formed in the working space by the permanent magnet members are changed by the magnetic flux control equipments shifting phases thereof.

The magnetic flux control equipments made of the electromagnets can be structured to wind a coil on a magnetic core, set one end of the magnetic core stuck or close to one magnetic pole end of a corresponding permanent magnet, control supplying of a current to the coil and change density of magnetic fluxes formed by one magnetic pole end of the permanent magnet in a required space. The propulsion magnetic field generator can form rotating magnetic fields by setting the permanent magnets on a specified circumference and straight advance magnetic fields by linearly setting the permanent magnets.

Furthermore, an energy converter of the invention is designed to pivotaly support a mover member freely rotatably or slidably in a working space of the propulsion magnetic field generator and generate displacing torque in the mover member by a propulsion magnetic field formed by the propulsion magnetic field generator.

In the propulsion magnetic field generator, density of magnetic fluxes formed in a working space by a plurality of permanent magnets set in accordance with a predetermined pattern for generating propulsion magnetic fields is changed by magnetic flux control equipments made of electromagnets set corresponding to the permanent magnets shifting phases thereof, thereby forming predetermined propulsion magnetic fields in a working space. Therefore, if a freely rotatably supported rotor or a freely slidably supported mover such as a slider and the like is set in the working space, rotational or moving torque is generated by displacing propulsion magnetic fields formed therein.

In a magnetic attraction driving engine of the invention, it is possible by means of the above-described driving principle to utilize magnetic fluxes formed from magnetic poles of a permanent magnet as mechanical energy in a state where supplying of energy from an outside system is shut off. It is also possible to expect a great deal of energy switching efficiency since an input from a DC power source necessary for this to function as a driving engine works in the same way as electricity supplied to an ignition plug in a gasoline engine and only an extremely small amount of this input is necessary for a generated driving power. Moreover, as a structure for taking out mechanical energy, one of a back and forth movement engine can be utilized and thus losses in a movement system caused by frictions can be reduced to a practical level.

A propulsion magnetic flux generator of the invention utilizing a magnetic attraction driving engine has a structure designed to generate required propulsion magnetic fields such as rotating magnetic fields and the like by controlling magnetic fluxes from permanent magnets by means of magnetic flux control equipments and magnetic force energy of the permanent magnets is utilized, and thus a highly efficient propulsion magnetic field generator can be provided.

Furthermore, in an energy converter utilizing the propulsion magnetic field generator, since a rotor, etc., can be moved by using a propulsion magnetic field generated with extremely high efficiency, efficiency of a motor, etc., can be improved.

BRIEF DEDESCRIPTION OF THE DRAWINGS

Other features and advantages of the invention will be apparent from the following description taken in connection with the accompanying drawings wherein.

DETAILED DESCRIPTION OF THE PREFERRED EMBODIMENTS

First Preferred Embodiment

Figure 1:
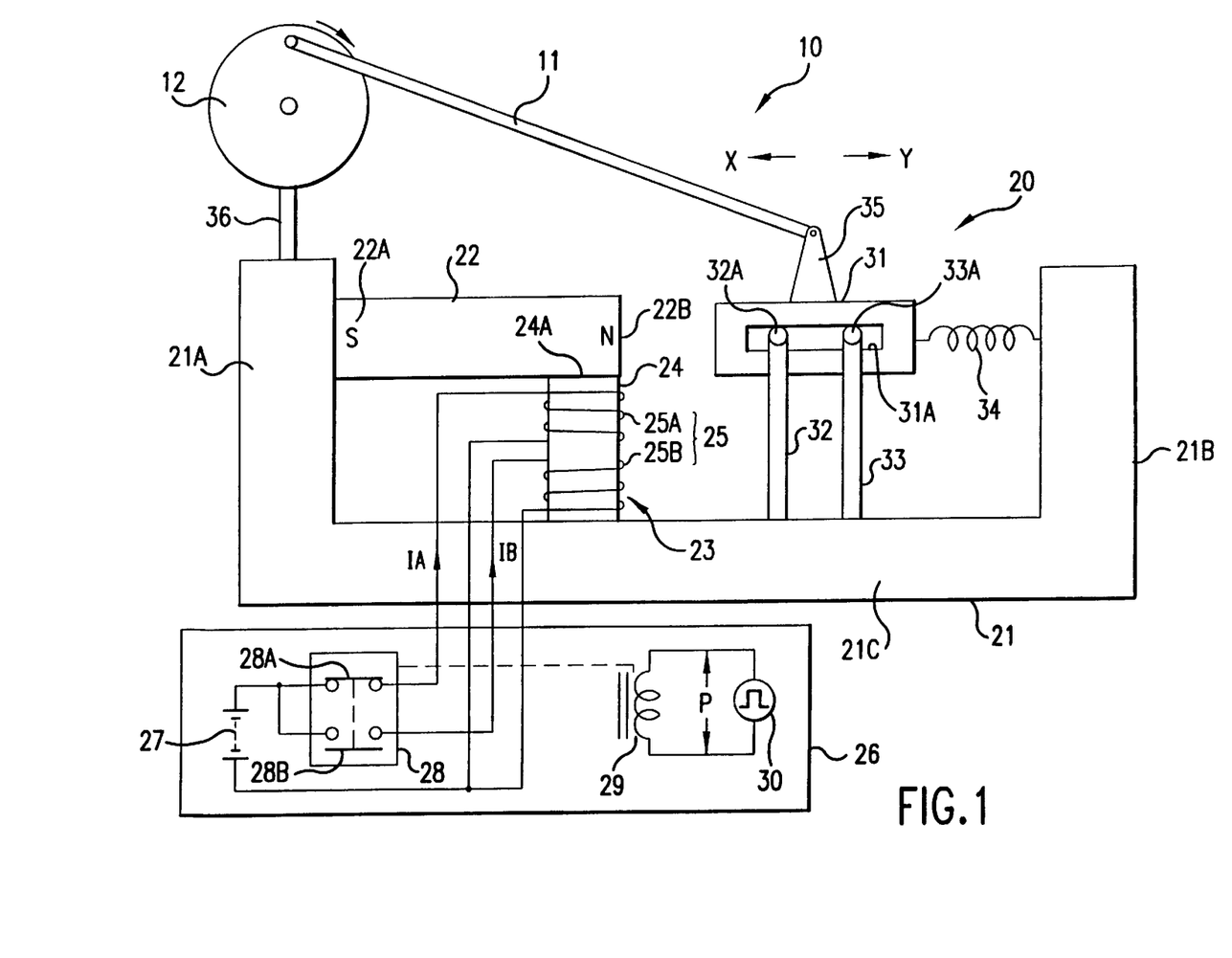
FIG. 1 is a structural view showing a magnetic attraction driving engine utilizing a permanent magnet in a first preferred embodiment.

FIG. 1 shows a prime mover structured by using a magnetic attraction driving engine which utilizes a permanent magnet in a first preferred embodiment of the invention.

This prime mover 10 transmits back and forth movement energy obtained from a magnetic attraction driving engine 20 structured according to the invention to a puri 12 by using a crank shaft 11 and in this way rotary motion is taken out by rotating the puri 12.

First, explanation will be made of a structure of the magnetic attraction driving engine 20.

In FIG. 1, a sign 21 indicates a fixed frame made of a rigid nonmagnetic material such as brass and the like, and a sign 22 indicates a permanent magnet fixed in a first arm 21A of the fixed frame 21 by proper means of bolts, etc. In the embodiment, an axial line of the permanent magnet 22 is extended roughly horizontally to a base part 21C of the fixed frame 21 and S magnetic pole end thereof 22A is fixed in the first arm 21A. An electromagnet 23 is provided between an N magnetic pole end 22B which is a free end of the permanent magnet 22 and the base part 21C. The electromagnet 23 is composed of a magnetic core 24 and a coil 25 wound thereon and the coil 25 includes two exciting coils 25A and 25B.

In the embodiment, an axial line of the magnetic core 24 is roughly perpendicular to that of the permanent magnet 22, one end surface 24A of the magnetic core member 24 is closely adhered to a side surface of the N magnetic pole end 22B of the permanent magnet 22 and the electromagnet 23 is fixed in the fixed frame 21 by proper means of bolts, etc.

The magnetic core member 24 can be structured as a bar-shaped member of iron, nickel, ferrite or permalloy or a thin plate laminated body made of these.

In the electromagnet 23, an excitation control unit 26 is provided for exciting the electromagnet 23 so as to cyclically change a condition of magnetic fluxes in the vicinity of the N magnetic pole end 22B of the permanent magnet. The excitation control unit 26 is provided with a battery 27 as a DC power source, a negative electrode of the battery 27 is connected to each end of the exciting coils 25A and 25B and positive electrode thereof is connected to the other end of the exciting coils 25A and 25B via a relay contact circuit 28.

A relay contact point 28A of the relay contact circuit 28 is structured as an always closed contact point while another relay contact point 28B is structured as an always opened contact point. To a relay coil 29 for switching ON/OFF both relay contact points 28A and 28B a pulse voltage P of a specified constant frequency is applied from a pulse generator 30. A cycle of the pulse voltage P is set so as not to exceed a response speed for operation of the contact points 28A and 28B by the relay coil 29 and in response to changes in a level of the pulse voltage P the relay contact points 28A and 28B are alternately closed. As a result, exciting currents IA and IB are caused to flow to the exciting coils 25A and 25B.

A direction for winding the exciting coil 25A is reverse to that for the exciting coil 25B, and when the the exciting current IA flows to the exciting coil 25A, an N magnetic pole is generated on one end surface 24A of the magnetic core 24, and when the exciting current IB flows to the exciting coil 25B, an S magnetic pole is generated on one end surface thereof.

As a result, in case where an S magnetic pole is generated on one end surface 24A of the electromagnet 23, leakage of magnetic fluxes from the N magnetic pole end 22B of the permanent magnet 22 is extremely small thanks to closely adhered arrangement of the permanent magnet 22 and the electromagnet 23, most of the fluxes return through the magnetic core 24 to the S magnetic pole end thereof and thus the number of those going out of the N magnetic pole end 22B is extremely small (hereinafter, this is called "a state of magnetic flux OFF"). Conversely, in case where an N magnetic pole is generated on one end surface 24A of the electromagnet 23, no magnetic fluxes from the N magnetic pole end 22B of the permanent magnet 22 pass through the magnetic core 24 and thus a condition of magnetic fluxes in the vicinity of the N magnetic pole end 22B is the same as that in case where no electromagnet 23 is provided (hereinafter, this is called "a state of magnetic flux ON"). Therefore, in accordance with changes in a level of the pulse voltage P, a condition of magnetic fluxes, that is, density of magnetic fluxes, in the vicinity of the N magnetic pole end 22B of the permanent magnet 22 changes.

In order to transform a change in the density of magnetic fluxes into an electromagnet attracting force and take this out as mechanical energy, a movable member 31 is provided in the vicinity of the N magnetic pole end 23B. In the embodiment, as shown in the drawing, the movable member 31 is formed of iron which is a magnetic material so as to provide magnetic attractivity and guiding rollers 32A and 33A on an upper end of supporting legs 32 and 33 vertically provided in the fixed frame 21 are freely slidably engaged with and fitted into a supporting and guiding groove 31A formed in the movable member 31. Thus, the movable member 31 is supported by the supporting legs 32 and 33 so that axial line thereof is roughly parallel to that of the permanent magnet 22 and this is also guided so as to be capable of moving back and forth in a direction of axial line thereof.

Furthermore, in case where a movable member 31 is made of both nonmagnetic and magnetic members (this can also be structured to obtain required magnetic attractivity by means of the magnetic member), it is preferable for the movable member 31 to be structured so that the magnetic member is placed as close as possible to the permanent magnet.

A contracting coil spring 34 is provided between the movable member 31 and a second arm 21B of the fixed frame 21. The contracting coil spring 34 is used to give a required returning force for pulling the movable member away from the permanent magnet 22 so as to allow the movable member 31 to move back and forth thereto in accordance with a change in a magnetic attracting force worked between the movable member 31 and the permanent magnet 22. A force of the contracting coil spring 34 allows, in a state of magnetic flux ON, the movable member 31 to move in a direction of an arrow X by means of a magnetic attracting force of the permanent magnet 22. In a state of magnetic flux OFF, on the other hand, this allows the movable member 31 to be fully pulled back in a direction of an arrow Y.

Instead of the contracting coil spring, it is possile to use a plate spring, a natural or a synthetic rubber member, or an appropriate elastic member.

A supporter 35 is fixed in an upper part of the movable member 31, one end of a crank shaft 10 is pivotally supported on the supporter and other end thereof is pivotally attached to the vicinity of an outer peripheral edge of the puri 12 axially provided freely rotatably in a supporter 36 fixed in the first arm 21A.

In the prime mover 10 shown in FIG. 1, in the exciting control unit 26, when a pair of relay contact points 28A and 28B are alternately closed in response to a pulse voltage P, exciting currents IA and IB are alternately supplied from the battery 27 to the exciting coils 25A and 25B and N and S magnetic poles are alternately generated on one end surface 24A of the exciting member 24. When an S magnetic pole is generated on one end surface 24A, magnetic fluxes from the N magnetic pole end 22B of the permanent magnet 22 return through the magnetic core 24 to the S magnetic pole end 22A without going toward the movable member 31. That is, a state of magnetic flux OFF is generated, no big magnetic attracting forces work between the permanent magnet 22 and the movable member 31 and the movable member 31 is fully pulled back in a direction of an arrow Y by a contraction elastic force of the contracting coil spring 34.

On the other hand, when an N magnetic pole is generated on one end surface 24A, magnetic fluxes from the N magnetic pole end 22B of the permanent magnet go toward an oppositely placed movable member together with those from the electromagnet 23, since these cannot go through the magnetic core 24 closely adhered thereto. That is, a state of magnetic flux ON is generated, a big magnetic attracting force works between the permanent magnet 22 and the movable member 31 and the movable member 31 is fully moved in a direction of an arrow X against a contracting elastic force of the contracting coil spring 34.

In short, if no magnetic fluxes from the permanent magnet 22 are caused to go through the magnetic core 24 by actively forming an N magnetic pole on one end surface 24A, no leakage of magnetic fluxes occurs because most of those from the permanent magnet 22 go through the movable member 31, thereby improving efficiency.

As is clear from the above description, polarities of magnetic poles generated on one end surface 24A of the electromagnet 23 are alternately switched between N and S and thus the movable member 31 is caused to move back and forth cooperatively with the contracting coil spring 34 making it possible to obtain a rotational output from the puri 21.

Here, since the number of magnetic fluxes φ to determine strength of the electromagnet 23 necessary for switching magnetic fluxes from the permanent magnet 22 is proportional to a product between a winding number N of a coil thereof and a current I flowing thereto, the following expression is obtained:

φ=k NI

A value of the number of magnetic fluxes φ necessary for ON/OFF switching of the magnetic fluxes is set at specified constant one and thus a value of an exciting current I can be made small if the winding number N of a coil of the electromagnet is set large. DC energy supplied to the electromagnet 23 is V×I if an output voltage of the battery 28 is V and thus supplied DC energy can be reduced if a value of I is set small and the device can be actuated highly efficiently.

Furthermore, in the description of the first preferred embodiment, reference was made to case where a usual electromagnet is used. It is needless to say, however, that efficiency can be further improved if superconductive electromagnets 31, 32, . . . 36 are used. One of the magnetic poles of the permanent magnet 22 opposite to the movable member 31 was an N magnetic pole in the above-described embodiment. However, an S magnetic pole may be used for this. Moreover, it is not always necessary to set directions for winding the exciting coils 25A and 25B of the electromagnet reverse to each other and the same effect as in the case of the embodiment can be obtained by setting reverse directions for supplying currents to both exciting coils 25A and 25B.

Second Preferred Embodiment

Figure 2:
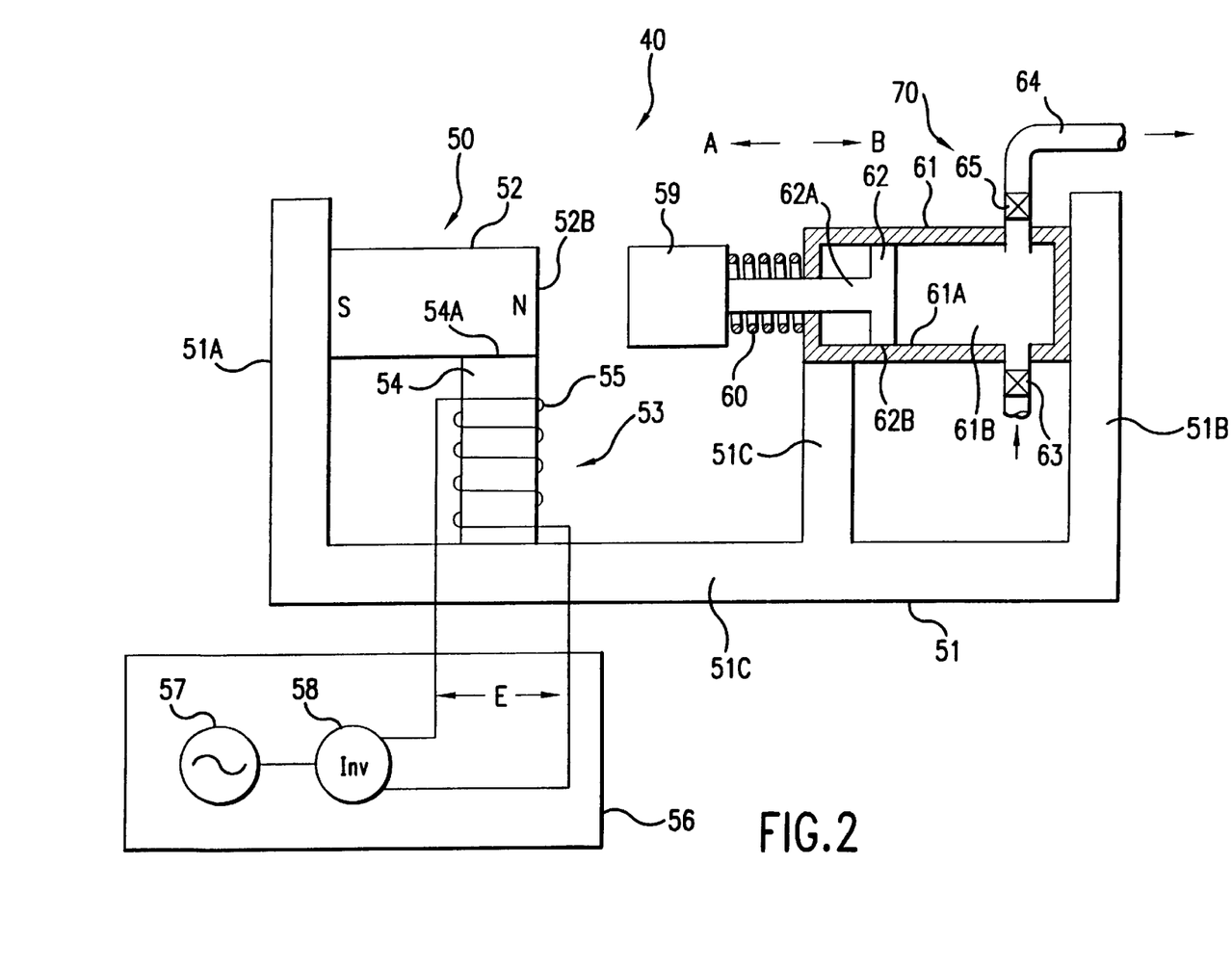
FIG. 2 is a structural view showing a magnetic attraction driving engine utilizing a permanent magnet in a second preferred embodiment.

FIG. 2 shows a prime mover structured by using a magnetic attraction driving engine which utilizes a permanent magnet in a second preferred embodiment of the invention. A device indicated by a sign 40 is an air compressor utilizing back and forth movement at it is obtained by a magnetic attraction driving engine 50 provided by the invention.

In the magnetic attraction driving engine 50, a permanent magnet and an electromagnet 53 having a coil 55 wound thereon are attached to a fixed frame 51 made of a nonmagnetic material as shown in FIG. 2, this attachment is basically the same as in the case of the first embodiment and thus explanation thereof will be omitted. A coil 55 of the electromagnet 53 is a single coil and connected to an excitation control unit 56 for controlling excitation of the electromagnet 53.

The excitation control unit 56 is provided with an inverter 57 capable of receiving AC power supplied from an AC power source 57 and outputting an AC rectangular wave voltage E of 0 to 60 [Hz]. In this preferred embodiment, an AC rectangular wave voltage E is outputted from the inverter 58 and applied to the coil member 55. Therefore, N and S magnetic poles are generated on one end surface 54A of a magnetic core 54 of the electromagnet 53 in accordance with a cycle of this AC rectangular wave voltage E and thereby density of magnetic fluxes in the vicinity of an N magnetic pole end 52B of the permanent magnet 52 is caused to change based on the same principle as in the case of the first embodiment.

In the vicinity of the N magnetic pole end 52B of the permanent magnet 52, a movable member 59 made of iron which is a magnetic material is provided. The movable member 59 is stuck to a free end of a rod 62A of a piston 62 slidaly provided in an air cylinder 61 supported and fixed by second and third arms 51B and 51C of the fixed frame 51.

An airtight state is maintained beween an outer peripehral surface 62B of the piston 62 and an inner wall surface 61A of the air cylinder 61 and a pressurizing chamber 61B is plotted in the air cylinder 61. In the air cylinder 61, an air intake valve 63 for introducing air from the air pressurizing chamber 61A and a check valve 65 for discharging compressed air pressurized in the air cylinder 61 to an output pipe 64 are provided including a generally known air pressurizing device 70. In the air pressurizing device 70, outside air is introduced from the air intake valve 63 into the pressurizing chamber 61B when the piston 62 moves in a direction of an arrow A, intaken air is pressurized in the pressurizing chamber 61B when the piston 62 moves in a direction of an arrow B, and when pressurizing force thereof exceeds a specified value, the check valve 65 is opened and the air is compressed and discharged to the output pipe 64.

In order to obtain back and forth movement of the piston 62 necessary for intaking and compressing air by means of the magnetic attraction driving engine 50, the movable member 59 is directly connected to the piston 62. A contracting coil spring 60 is provided between the movable member 59 and the air cylinder 61 and a returning force is given to pull back the movable member 59 in a direction of an arrow B by an elastic contracting force of the contracting coil spring 60.

According to the above-described structure, by alternately generating S and N magnetic poles on one end surface 54A of the electromagnet 53, as in the case of the first embodiment shown in FIG. 1, the movable member 59 is cause to move back and forth at the same cycle as that of an AC rectangular wave voltage E by intermittently generated magnetic attracting forces of the permanent magnet 52 and returning forces of the contracting spring 60 and thus the piston 62 can be moved back and forth. As a result, an air compressor 40 can take compressed air out of the output pipe 64 by excitation control of the electromagnet device 52 using an AC rectangular wave voltage E from the excitation control unit 56.

A pump can be structured in the same way as the air compressor shown in FIG. 2.

Third Preferred Embodiment

Figure 3:
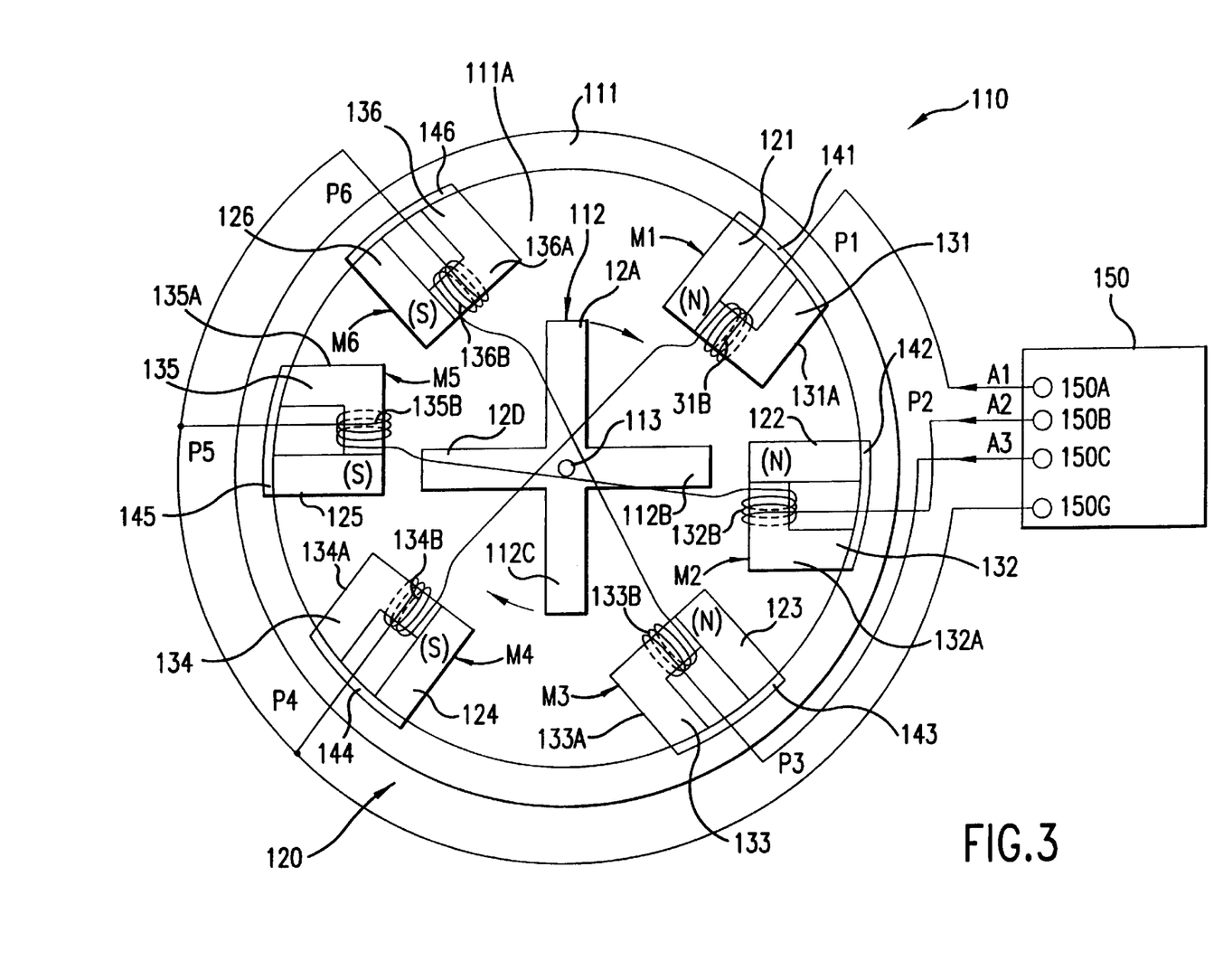
FIG. 3 is a view showing a structure of a rotational motor in a propulsion magnetic field generator in a first embodiment.

FIG. 3 shows a DC type rotational motor. A stator side device is structured by a rotational motor 110 having a cylindrical frame 111 made of a nonmagnetic material and a revolving magnetic field generator 120 set therein.

Inside the frame 111, a working space 111A is formed so as to generate a propulsion magnetic field rotated by the revolving magnetic field generator 120 and a rotor 112 made of s soft iron nonmagnetic material is axially provided freely rotatably in the working space 111a via a rotary shaft 113. The rotary shaft 113 is positioned in a center axis of the frame 111, both ends thereof are freely rotatably set and prevented from moving in a direction of the rotary shaft 113 and thus the rotor 112 rotates integrally with the rotary shaft 113 inside the frame 111.

The revolving magnetic field generator 120 is provided with six bar-shaped permanent magnets 121, 122, 123, ... 126 having rectangular sections, and these permanent magnets 121, 122, 123, ... 126 are set at substantially equal spaces along an inner peripheral surface of the frame 111 with axes thereof lined up in a diameter direction of the frame 111. Signs 141, 142, ... 146 indicate yoke members buried and fixed along an inner peripheral surface of the frame 111 as shown in the drawing and these are made of plate permalloy as a soft magnetic material. The yoke members 141, 142, ... 146 are respectively set on positions PI, P2, ... P6 of the permanent magnets 121, 122, 123, ... 126 and fixed in the frame 111 (there is no limit to fixing means) so as to stick each one end of the permanent magnets 121, 122, ... 126 to corresponding one of the yoke members 141, 142, ... 146.

Soft magnetic materials used for the yoke members 141, 142, ... 146 are not limitted to permalloy, and other kinds can be made use of.

In the above-described structure, N magnetic poles of the permanent magnets 121, 122 and 123 set on the positions P1, P2 and P3 are placed oppositely to the rotor 112 while S magnetic poles of the permanent magnets 124, 125 and 126 set on the positions P4, P5 and P6 are placed oppositely to the rotor 112. (magnetic polarity of a permanent magnet set on each position can be optionally selected not limited to one in the embodiment shown in the drawing).

Signs 131, 132, ... 136 indicate electromagnets as magnetic flux control means for controlling magnetic fluxes formed from the permanent magnets 121, 122, ... 126 in the working space 111A and provided corresponding to each thereof. The electromagnets 131, 132, ... 136 are respectively composed of L-shaped magnetic cores 131A, 132A, ... 136A made of soft magnetic materials such as permalloy and the like and coils 131B, 132B, ... 136B wound thereon. Each one end of the magnetic cores 131A, 132A, ... 136A is stuck to one side surface of a free end of a corresppondng permanent magnet and another end thereof is stuck to that of the yoke members 141, 142, ... 146, and six stator side magnetic poles M1, M2, ... M6 are formed in the frame 111.

Explanation will be made of a stator side magnetic pole M1.

Between N and S magnetic poles of the permanent magnet 121, a magnetic path made of the yoke member 141 and the magnetic core 131A of the electromagnet 131 is formed. Therefore, in case where no current flows to the coil 131B or a current is applied thereto so that one end of the magnetic core 131A is an S magnetic pole, most of magnetic fluxes from the permanent magnet 121 go through the closed magnetic path made of the yoke member 141 and the magnetic core 131A, work to return from the N magnetic pole to the S magnetic pole, and consequently magnetic fields by magnetic fluxes from the permanent magnet 131 are not formed in the working space 111A. (Hereinafter, this is called "a state of magnetic flux OFF").

On the other hand, if a current is applied to the coil 131B so that one end of the magnetic core 131A is an N magnetic pole, magnetic fluxes from the permanent magnet 121 are not allowed to pass through the closed magnetic path made of the yoke member 141 and the magnetic core 131A, these magnetic fluxes return from the N magnetic pole through the working space 111A to the S magnetic pole, and consequently magnetic fields by magnetic fluxes from the permanent magnet 131 are formed in the working space 111A. (Hereinafter, this is called "a state of magnetic flux ON").

As described above, by controlling a current applied to the electromagnet 131, it is possible to control density of magnetic fluxes outputted from the permanent magnet 121 to the working space 111A and to switch ON/OFF magnetic fluxes outputted from the permanent magnet 131 to the working space 111A by the electromagnet 131.

As for other stator side magnetic poles M2, M3, ... M6, it is also possible to switch ON/OFF magnetic fluxes outputted from the permanent magnets 122, 123, ... 126 to the working space 111A by performing similar control with currents supplied to the electromagnets 132, 133, ... 136.

A sign 150 indicates a control unit for controlling switching of exciting currents applied to the coils 131B, 132B, ... 136B of the electromagnets 131, 132, ... 136, and by switching ON/OFF magnetic fluxes from the permanent magnets for the stator side magnetic poles M1, M2, ... M6 with a specified phase difference revolving magnetic fields are formed in the working space 111A. In the third embodiment, the control unit 150 is provided with a grounding terminal 150G and three output terminals 150A, 150B and 150C, and three groups of exciting voltages, one including first, second and third exciting voltages A1, A2 and A3, having phases different from one another, are outputted therefrom.

In the revolving magnetic field generator 120, the coils 131B and 134B, the coils 132B and 135B and the coils 133B and 136B are respectively connected to each other in series. A first exciting current is supplied to the coils 131B and 1346, a second exciting current to the coils 132B and 135B and a third exciting current to the coils 133B and 136B.

Figure 4:
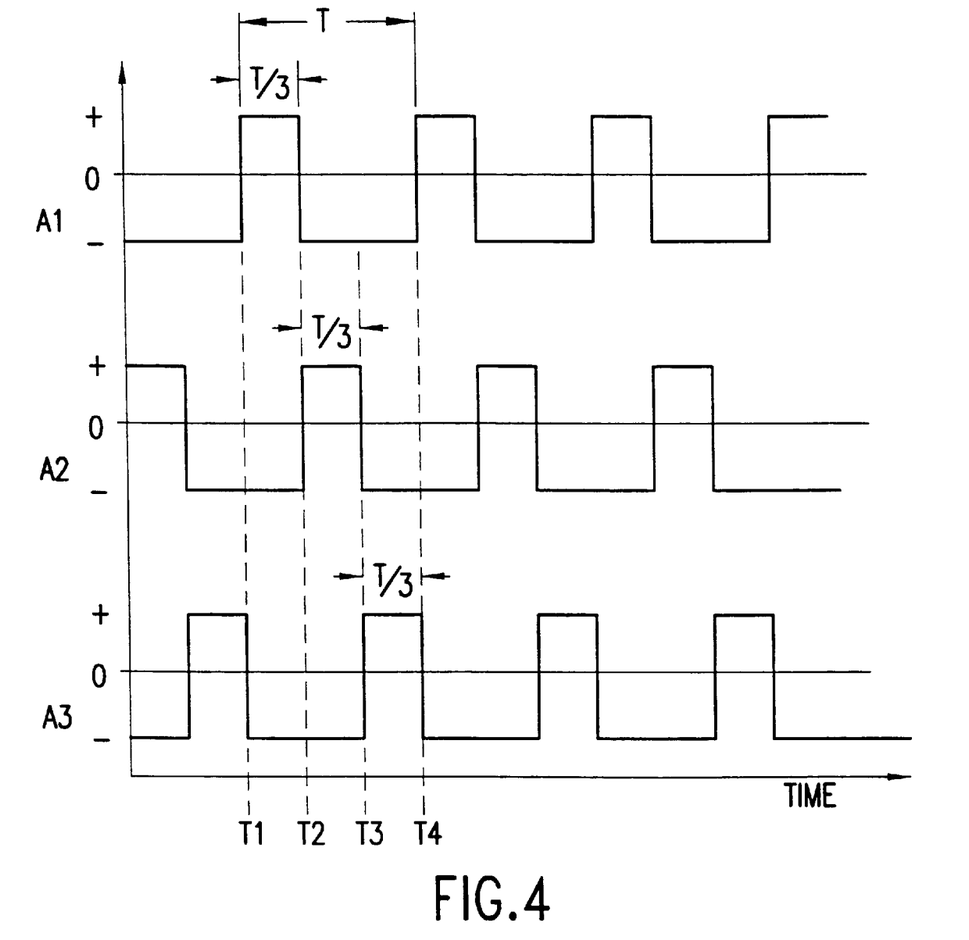
FIG. 4 is a wave form chart showing waveforms of first to third exciting voltages shown in FIG. 3.

FIG. 4 shows exciting voltages phase-controlled by the control unit 150, first, second and third exciting voltages A1, A2 and A3 are repeating pulse voltages, each having a cycle T, by shifting a phase for a period of only ⅓ of one cycle an exciting voltage of a positive direction is supplied to any one of the phases and an exciting voltage of a negative direction is supplied to the remaining two phases.

When the first exciting voltage A1 is applied to the coils 131B and 134B with a positive polarity for a period of time T1 to T2, one end of the magnetic core 131A of the electromagnet 131 is excited to be an N magnetic pole and thereby a magnetic flux of the corresponding permanent magnet 121 is formed in the working space 111A. One end of the magnetic core 134A of the electromagnet 134 is excited to be an S magnetic pole at this time and thereby a magnetic flux of the corresponding permanent magnet 124 is formed in the working space 111A. That is, the stator side magnetic poles M1 and M4 are both in states of magnetic flux OFF. To the other coils 132B, 135B, 133B and 136B the second and third exciting voltages are applied with negative polarity. In this way, exciting currents are caused to flow to both electromagnets 132 and 135 so that one end of the magnetic core 132A of the electromagnet 132 is an S magnetic pole and one end of the magnetic core 135A of the electromagnet 135 is an N magnetic pole.

Also, exciting currents flow to both electromagnets 133 and 136 so that one end of the magnetic core 133A of the electromagnet 133 is an S magnetic pole and one end of the magnetic core 136 of the electromagnet 136 is an N magnetic pole. That is, since the stator side magnetic poles M2, M3, M5 and M6 are all in states of magnetic flux OFF, no magnetic fluxes are outputted from the permanent magnets 122, 123, 125 and 126 to the working space 111A.

As a result, since a magnetic flux from the N magnetic pole of the permanent magnet 121 of the stator side magnetic pole M1 is introduced through the rotor 112 into the S magnetic pole the permanent magnet 124 of the stator side magnetic pole M4, for instance a projected pole 112C of the rotor 112 is attracted into the stator side magnetic pole M1, a projected pole 112C thereof is attracted into the stator side magnetic pole M4 and the rotor 112 rotates clockwise shown in FIG. 1.

As can be understood from FIG. 4, by causing the stator side magnetic poles M1, M2, . . . M6 to be in states of magnetic flux ON, revolving magnetic fields are generated in the working space 111A, rotational torque is generated in the rotor 112 and then the rotor 112 is caused to continuously rotate in a specified direction.

Figure 5:
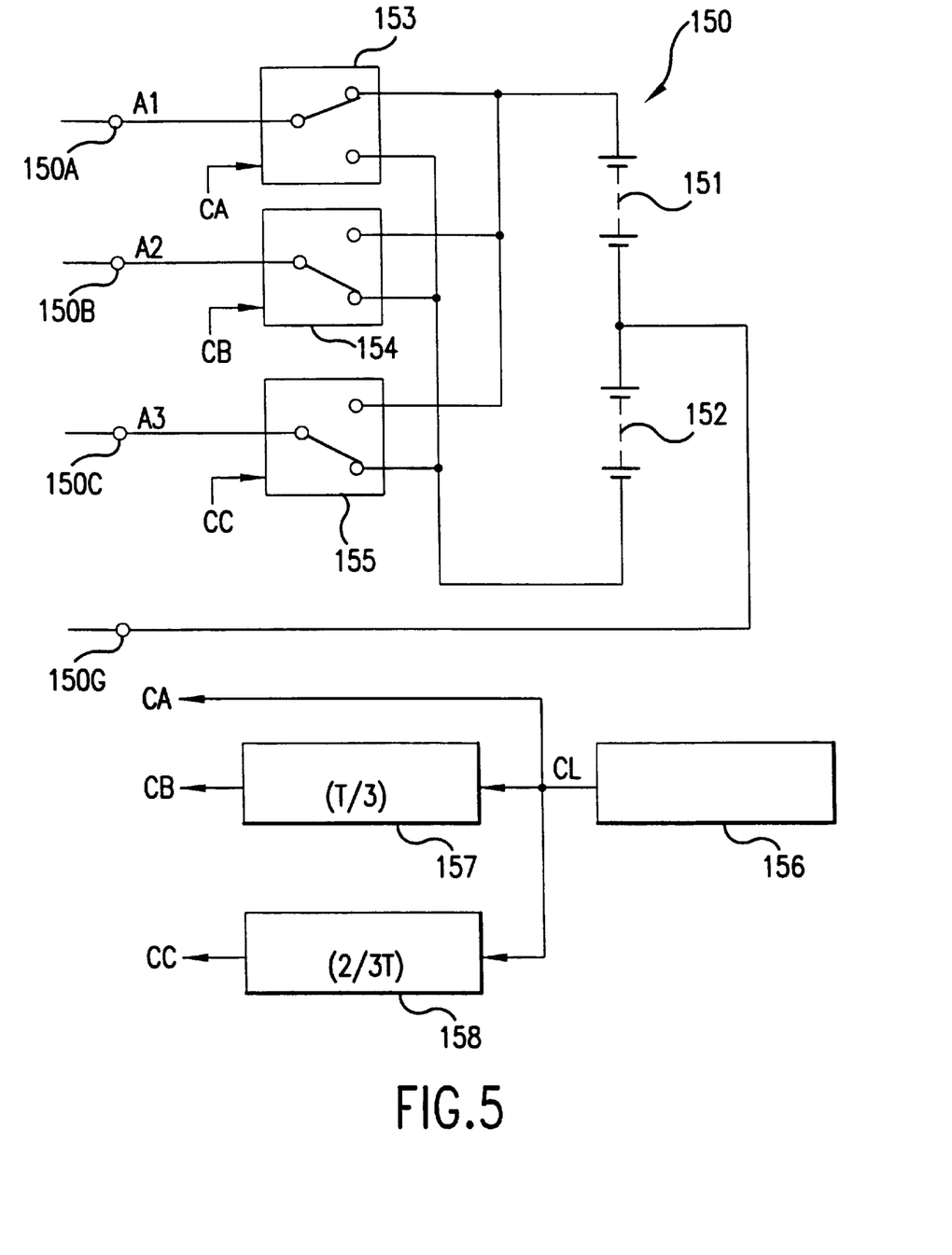
FIG. 5 is a detailed circuit diagram of a control unit shown in FIG. 3.

FIG. 5 is a detailed diagram showing a circuit for outputting a group of exciting voltages shown in FIG. 2. In the drawing, a sign 151 indicates a positive power source for supplying a positive voltage, a sign 152 a negative power source for supplying a negative voltage, signs 153, 154 and 155 switches, a sign 156 a pulse generator for outputting a pulse CL which becomes a high level for only a period of ⅓ of a cycle T shown in FIG. 4. The pulse CL is supplied to the switch 153 as a first switch control signal CA, a terminal 150A is connected to the positive power source 151 when the first switch control signal CA is a high level and the terminal 150A is connected to the negative power source 152 when the first switch control signal CA is a low level. As a result, a first exciting voltage AI shown in FIG. 4 can be supplied from the terminal 150A.

Figure 6:
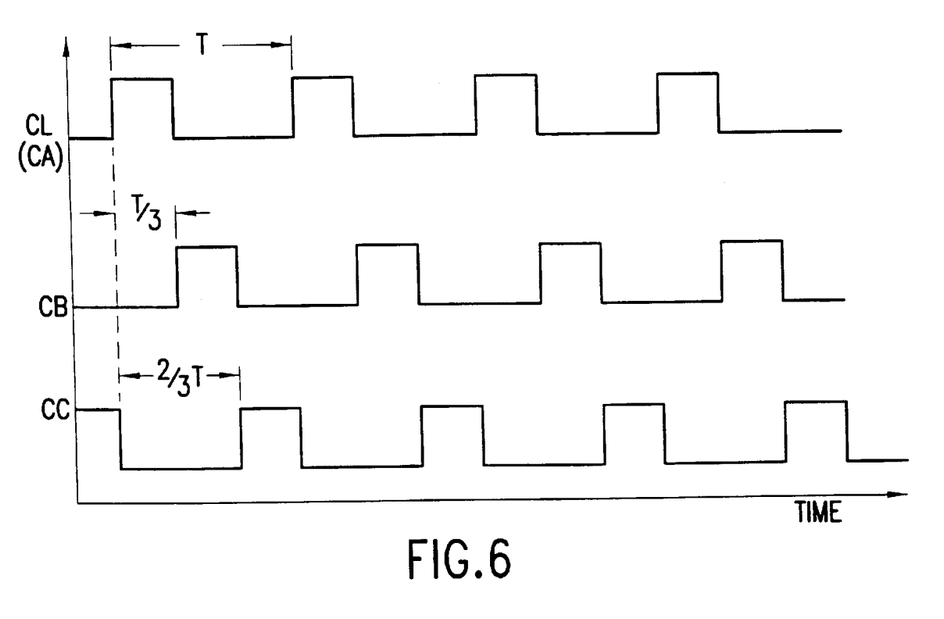
FIG. 6 is a wave form chart of switching control signals shown in FIG. 5.

As shown in FIG. 6, the pulse CL is caused to be a second switch control signal CB delayed by a first delaying circuit 157 for giving delay of only ⅓ time of the cycle T and given to the switch 154 as a signal for switching control. As in the case of the switch 153, the switch 154 is switched in accordance with a level of the second switch control signal CB and thus a second exciting voltage A2 shown in FIG. 4 can be supplied from a terminal 150B. A second delaying circuit 158 delays the pulse CL by a period of only ⅓ of the cycle T and outputs a third switch control signal CC shown in FIG. 6. The switch 155 works in response to the third switch control signal CC as in the cases of the other switches and thus a third exciting voltage A3 shown FIG. 4 can be supplied from a terminal 150C.

It is clear from the above description that the switches 153, 154 and 155 shown in FIG. 5 indicate switching conditions during periods of T1 to T2 shown in FIG. 4.

Here, the number of magnetic fluxes φ for determining strengths of the electromagnets 131, 132, . . . 136 necessary to switch ON/OFF magnetic fluxes of the stator side magnetic poles M1, M2, . . . M6 is proportional to a product between the number of winding a coil thereof and a current I supplied thereto and thus the following expression is obtained:

φ=k NI

Since the number of magnetic fluxes φ necessary for switching ON/OFF of magnetic fluxes of the Permanent magnets 121, 122, . . . 126 is a specified constant value, a value of a current I for excitation can be made small if the number N of windings of a coil on an electromagnet is set large. This makes it possible to conserve energy serially supplied from the positive and negative power sources 151 and 152 to the electromagnet 131, 132, . . . 136.

In the description of the third preferred embodiment, reference was made to case where a usual electromagnet is used. It is needless to say, however, that efficiency can be further improved by using superconductive magnets for the electormagnets 131, 132, . . . 136.

In a nutshell, the rotational motor 110 of the invention is structured to generate revolving magnetic fields by switching ON/OFF magnetic fluxes from the permanent magnets and give rotational torque to the rotor 112 and thus it is very easy to design a space between the rotor 112 and the stator side. Since an inductive motor is a kind of trance, motor efficiency can be improved by making the space small. However, it is preferable in the rotational motor 110 of the invention that the space is designed to be sufficiently large in order to increase an initial attracting force. This consequently makes it possible to enlarge the space between the rotor 112 and the stator side in the rotational motor 110 and manufacture a motor having strong resistance to temperature increases.

Figure 7:
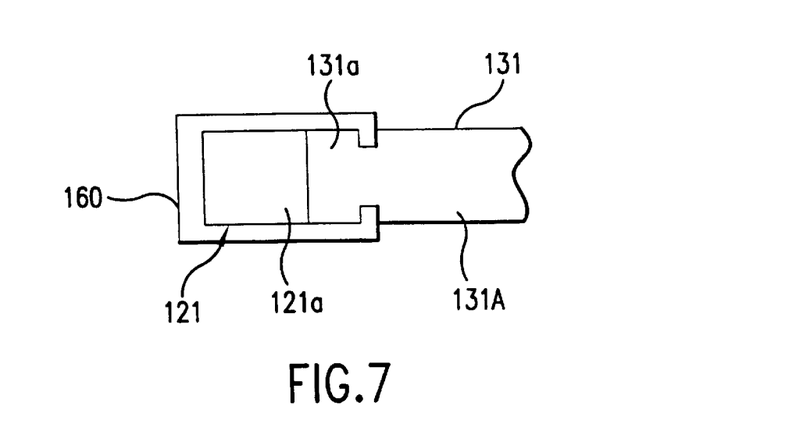
FIG. 7 is a main part structural view showing a state of connection between a permanent magnet in a fixed electrode and a magnetic core of an electromagnet in FIG. 3.

FIG. 7 shows in detail means for connecting a permanent magnet and an electromagnet in each stator side magnetic pole in the third embodiment. When magnetic fluxes are switched ON, a strong separating force is applied on both magnetic core and permanent magnet in the electromagnet by a repulsive force worked thereon, and thus taking the stator side magnetic pole M1 as an example, a free end 121a of the permanent magnet 121 and an end 131a of the magnetic core 131A of the electromagnet 131 stuck thereto are firmly bound to each other by a clamping member 160 so as to surely keep both in a closely adhered state.

Fourth Preferred Embodiment

Figure 8:
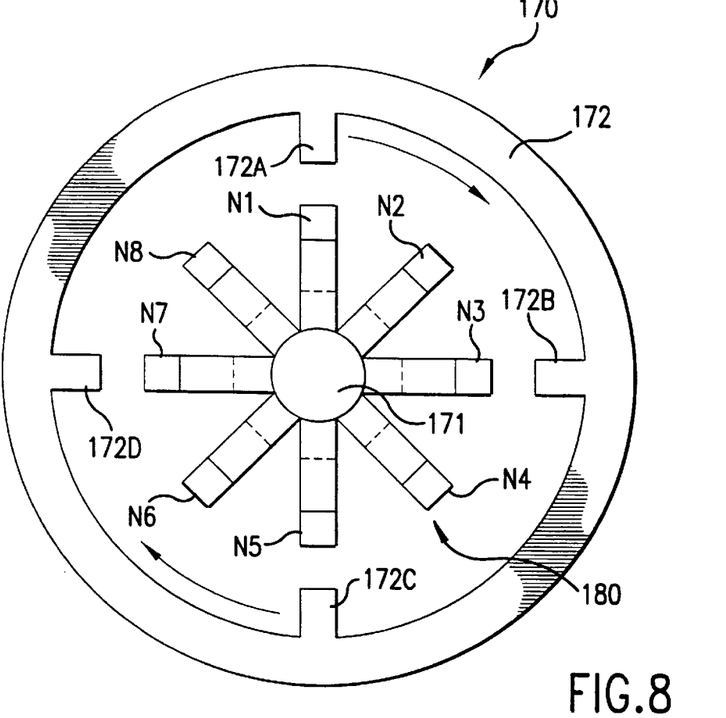
FIG. 8 is a view showing a structure of a rotational motor in a propulsion magnetic field generator in a second embodiment.

FIG. 8 shows a rotational motor in another embodiment of the invention. In this rotational motor 170, a revolving magnetic field generator 180 is provided in a fixed shaft 171, a cylindrical movable body 172 made of a magnetic material is axially provided freely rotatably so as to be coaxial with the fixed shaft 171 and magnetic projected poles 172A, 172B, . . . 172D are formed in the movable body 172. Eight stator side magnetic poles N1, N2, . . . N8 are set in a circumferential direction of the fixed shaft 171 at equal spaces and the magnetic projected poles 172A, 172B, . . . 172D are provided integrally with the movable body 172.

Figure 9:
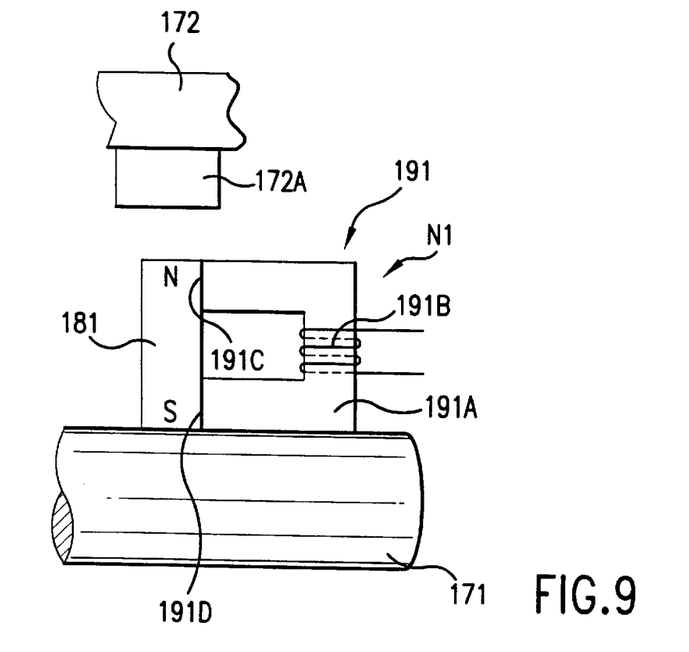
FIG. 9 is an expanded view of main parts in FIG. 8.

In the stator side magnetic pole N1, as shown in FIG. 9, a prismatic bar-shaped permanent magnet 181 like that in the third embodiment in FIG. 3 is fixed on the fixed shaft 171 so that axis thereof is orthogonal to an axis of the shaft 171 and an electromagnet 191 formed by winding a coil 191B on a U-shaped magnetic core 191A is provided as a magnetic flux controller.

End surfaces 191C and 191D of both legs of the magnetic core 191A are stuck to N and S magnetic parts of the permanent magnet 181, and this makes it possible to secure a magnetic path between one magnetic pole and other of the permanent magnet 181 without using a yoke member.

As for the other stator side magnetic poles N2, N3, . . . N8, structures are the same as the above.

In the fourth embodiment, as in the cases of the above-described embodiments, it is possible to switch ON/OFF mgnetic fluxes from the permanent magnet 181 inside the movable body 172 as a working space by applying any one of exciting voltages to the coil 191B as explaned in FIG. 4. By performing switching ON/OFF of the magnetic fluxes with phase differences in the stator side magnetic poles N1, N2, . . . NB, it is possible to generate revolving magnetic fields, again as in the case of the third embodiment.

In case of the fourth embodiment, control is made to work one stator side magnetic pole as an N magnetic pole and another as an S magnetic pole with, for instance, stator side magnetic poles having spaces of 180° as one group, controls of this kind are sequentially executed in one round direction and thus revolving magnetic fields for rotating the movable body 171 can be generated.

Fifth Preferred Embodiment

Figure 10:
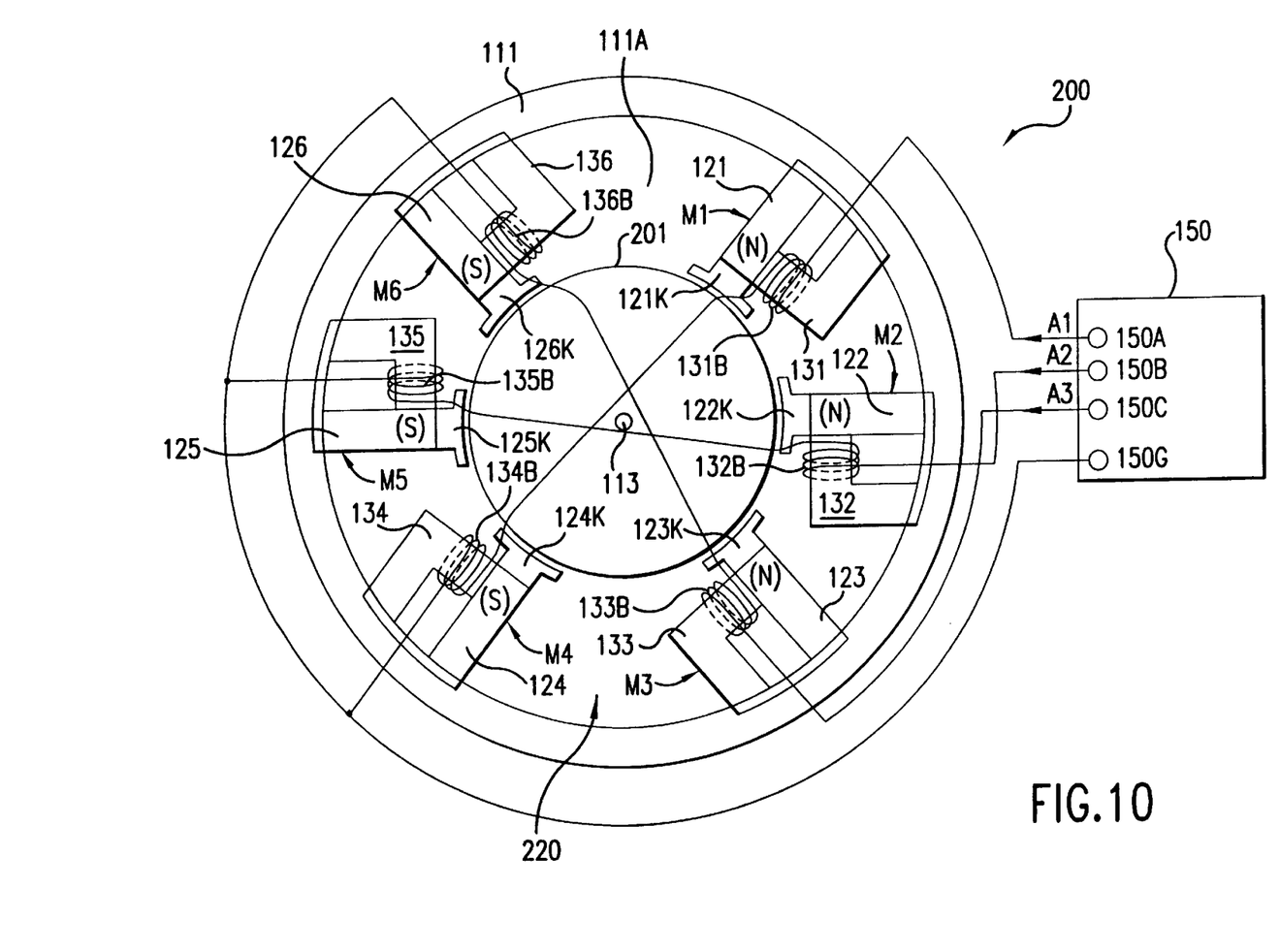
FIG. 10 is a view showing a structure of an inductive motor in a propulsion magnetic field generator in a third preferred embodiment.

FIG. 10 shows still another preferred embodiment of the invention. In the fifth embodiment, an example of structuring an inductive motor by using a propulsion magnetic field generator of the invention is shown.

A structure of an inductive motor 200 in FIG. 10 is basically the same as a rotational motor 110 shown in FIG. 3 excpet that a rotor 201 is provided in a rotary shaft 113. Therefore, the same signs are given to those corresponding to parts shown in FIG. 3 and explanation thereof will be omitted.

A revolving magnetic field generator 220 provided in a frame 111 is structured basically in the same way as a revolving magnetic field generator 120 in the third embodiment shown in FIG. 3. However, this is different from the revolving magnetic field generator 120 in that auxiliary magnetic pole pieces 121K, 122K, . . . 126K are provided in free ends of permanent magnets 121, 122, . . . 126 for the purpose of making spaces between stator side magnetic poles M1, M2, . . . M6 and the rotor 201 as small as possible.

The auxiliary magnetic pole pieces 121K, 122K, . . . 126K are formed as projected pole parts having opposed parts 121L, 122L, . . . 126L having the same curvature surfaces as those on an outer peripheral surface of the rotor 201 and from these auxiliary magnetic pole pieces 121K, 122K, . . . 126K magnetic fluxes from corresponding permanent magnets are outputted to a working space 111A. To electromagnets 131, 132, . . . 136 of the stator side magnetic poles M1, M2 . . . M6, three-phase exciting voltages, i.e. first, second and third exciting voltages A1, A2 and A3, are supplied from a control unit 150 as in the case in FIG. 3 and in this way revolving magnetic fields are generated in the working space 111A.

In the inductive motor 200, inductive currents are generated in the rotor 201 by these revolving magnetic fields and the rotor 201 is caused to rotate by interaction between magnetic fields generated by these inductive currents and those by the stator side magnetic poles M1, M2, . . . M6. This rotational principle is the same as one for a conventional inductive motor.

However, since in the inductive motor 200 in the fifth embodiment a revolving magnetic field generator 220 generates required revolving magnetic fields in the working space 111A by utilizing magnetic force energy of the permanent magnet, it is possible to-perform switching ON/OFF of magnetic fluxes by increasing the number of winding coils on the electromagnets and only by supplying small DC currents to the coils.

Furthermore, in the inductive motor of a conventional type, energy supplied from an outside power source for an exciting current $I_0$ of a stator iron core and a torque current $I_1$ for making magnetic fluxes to be transmitted to rotor torque were necessary. According to the invention, however, supplying of an exciting current $I_0$ is not necessary and thus highly efficient driving can be expected.

As many apparently widely different embodiments of this invention may be made without departing from the spirit and scope thereof, it is to be understood that the invention is not limited to the specific embodiments thereof except as defined in the appended claims.

FIG. 1

10. PRIME MOVER 22. PERMANENT MAGNET 23. ELECTROMAGNET DEVICE 26. EXCITATION CONTROL UNIT 31. MOVABLE MEMBER.

FIG. 2

40. AIR COMPRESSOR 52. PERMANENT MAGNET 53. ELECTROMAGNET DEVICE 56. EXCITATION CONTROL UNIT 59. MOVABLE MEMBER.

FIG. 3

110. ROTATIONAL MOTOR 111. FRAME 111A. WORKING SPACE 112. ROTOR 113. ROTARY SHAFT 120. REVOLVING MAGNETIC FIELD GENERATOR 150. CONTROL UNIT.

FIG. 4

A1. FIRST EXCITING VOLTAGE A2. SECOND EXCITING VOLTAGE A3. THIRD EXCITING VOLTAGE.

FIG. 5

156. PULSE GENERATOR 157. FIRST DELAYING CIRCUIT 158. SECOND DELAYING CIRCUIT.

FIG. 10

150. CONTROL UNIT.

What is claimed is:

1. An energy converter comprising:

a propulsion magnetic field generator provided on a fixed member for generating a propulsion magnetic field in a specified working space;

a mover member made of nonmagnetic material provided in said working space wherein said mover member is rotated by means of a propulsion magnetic field formed in said working space by said propulsion magnetic field generator;

said propulsion magnetic field generator including a plurality of permanent magnets each having a free end set at intervals on said fixed member, and a plurality of magnetic flux control units made of electromagnets formed by winding a coil around a magnetic core set adjacent to the free end of each of said permanent magnets; and a control device having at least two states of operation for controlling a density of magnetic fluxes from the permanent magnets by controlling a current applied to each of said electromagnets such that in the first state of operation substantially all of the magnetic fluxes from the permanent magnets are shunted through the magnetic core and in the second state of operation substantially all of the magnetic fluxes are outputted from each of said permanent magnets to the working space.

\* \* \* \* \*